(No Model.)
A. S. McCLURE & T. BOGGS.
LISTER CULTIVATOR.
No. 450,915. Patented Apr. 21, 1891.
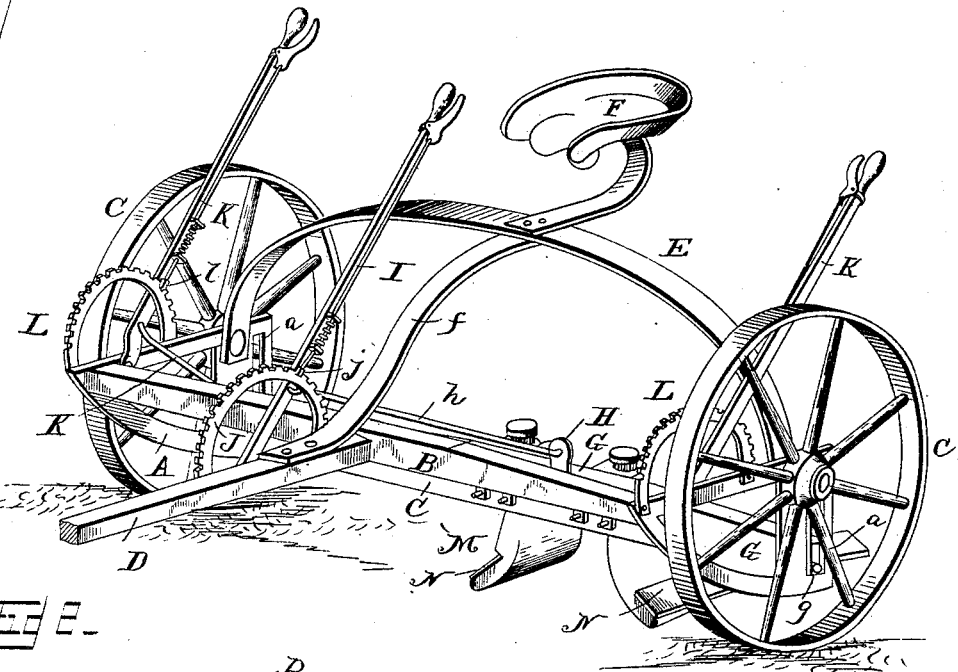
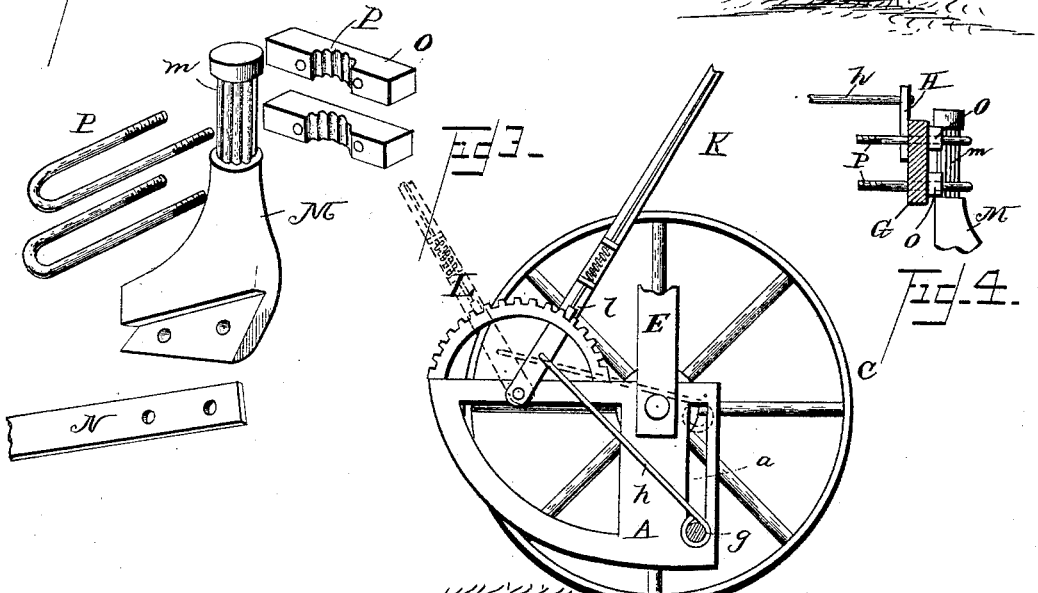
WITNESSES
F. L. Ourand
Van Buren Hillyard
INVENTORS
Alfred Silvers McClure
and Thomas Boggs
By R. S. & A. P. Lacey,
their Attorneys

UNITED STATES PATENT OFFICE.

ALFRED SILVERS McCLURE AND THOMAS BOGGS, OF CLAY CENTRE, KANSAS.

LISTER-CULTIVATOR.

SPECIFICATION forming part of Letters Patent No. 450,915, dated April 21, 1891.

Application filed November 13, 1890. Serial No. 371,340. (No model.)

*To all whom it may concern:*

Be it known that we, ALFRED SILVERS MC-CLURE and THOMAS BOGGS, citizens of the United States, residing at Clay Centre, in the county of Clay and State of Kansas, have invented certain new and useful Improvements in Lister-Cultivators; and we do hereby declare the following to be a full, clear, and exact description of the invention, such as will enable others skilled in the art to which it appertains to make and use the same.

This invention relates to cultivators, and has for its object to provide means for adjusting the knives to adapt them for rows of different widths and to devise simple contrivances for raising or lowering the bar to which the knives are connected.

The improvement consists of the novel features, which hereinafter will be more fully described and claimed, and which are shown in the annexed drawings, in which—

Figure 1 is a perspective view of a cultivator embodying our invention. Fig. 2 is a detail perspective view of the knife-standard and the blocks to which the same is secured. Fig. 3 is a detail view of one of the side frames, showing the journal of the knife-supporting bar in section and the adjustment of the same by dotted lines. Fig. 4 is a detail view showing the relative arrangement of the bar which supports the knives.

The side frames A A are similarly constructed, being approximately triangular-shaped. The wheels C C are journaled on spindle-arms, which are projected from the frames A. The draft-bar B is secured at its ends to the side frames A A, and the pole D is connected therewith. The side frames are strengthened by the truss-brace E, which is connected at its ends with the side frames in line with the wheel-spindles. The seat F is supported on the truss-brace, and the latter is braced by the stay-rod $f$. The bar G, which supports the knives, is provided at its ends with journals $g$, which enter slots $a$ in the vertical members of the side frames A and is adjusted or turned on its journals to vary the pitch of the knives by the arm H, link $h$, and lever I, the latter being mounted on the tongue or pole D and held in the located position by notched segment J and the latch-bolt $j$. The knife-supporting bar G is also vertically adjustable in the slots $a$ to throw the knives out of action, being raised and lowered by levers K and links $k$, the latter having connection with the levers K at one end and having their other ends fitted on the journals $g$. The notched segments L and the latch-bolts $l$ hold the levers K in the adjusted position. The knife-standards M are expanded at their lower ends and are beveled outward on their opposing sides, and are cut away on their outer sides to form seats for the knives N, which are straight and set to incline inwardly from their lower edges. The standards M are reduced near their upper ends and provided with vertical ribs or flutes $m$. The blocks O, secured to the bar G, are depressed and provided with ribs or flutes $p$ to receive the fluted or ribbed portion $m$ of the standards M, which latter are held to the blocks and the knife-supporting bar G by the clips P.

To adjust the knives at a greater or less relative angle, the clips P are loosened until the ribbed or fluted portion $m$ of the standards is disengaged from the ribbed or fluted portion of the blocks O, when the desired adjustment can be effected, the knives being held in the adjusted position by retightening the clips P. The pitch of the knives is adjusted by turning the bar G on its journals $g$, which is effected by means of the lever I, link $h$, and the arm H, as hereinbefore described.

The knives are thrown out of work by means of the levers K and links $k$, as previously set forth.

Having thus described our invention, what we claim, and desire to secure by Letters Patent, is—

1. The combination of the side frames having approximately vertical ways, as the slots $a$, the bar G, having the knives secured thereto and having its ends journaled in the said ways, the lever for turning the bar G on its journals, and means for adjusting the said bar in the said ways, substantially as and for the purpose described.

2. The combination of the side frames A, having the approximately vertical slots $a$, the knife-supporting bar G, having its ends extended into the said slots $a$, the lever I for turning the bar G on its journals, the levers K, and the links $k$, having one end connected with the levers K and having their other ends fitted to the journals of the bar G, substantially as and for the purpose described.

In testimony whereof we affix our signatures in presence of two witnesses.

ALFRED SILVERS McCLURE.
    THOMAS BOGGS.

Witnesses:
    WILLIAM GRUNDAL,
    F. P. GRAHAM.